(12) United States Patent
Fain

(10) Patent No.: US 6,192,621 B1
(45) Date of Patent: Feb. 27, 2001

(54) GARDEN PEST CONTROL DEVICE

(76) Inventor: Gerald Sterling Fain, 18 Lomas Dr., Framingham, MA (US) 01701

( * ) Notice: Subject to any disclaimer, the term of this patent is extended or adjusted under 35 U.S.C. 154(b) by 540 days.

(21) Appl. No.: 08/774,848

(22) Filed: Dec. 27, 1996

Related U.S. Application Data

(63) Continuation of application No. 08/399,570, filed on Mar. 7, 1995, now abandoned.

(51) Int. Cl.[7] .............................. A01M 25/00; A01M 1/20
(52) U.S. Cl. ................................................................ 43/131
(58) Field of Search ............................... 43/121, 122, 131

(56) References Cited

U.S. PATENT DOCUMENTS

| Re. 14,782 | * | 12/1919 | Hedrich | 43/131 |
|---|---|---|---|---|
| 478,691 | * | 7/1892 | Peshon | 43/131 |
| 1,443,287 | * | 1/1923 | Snyder et al. | 43/131 |
| 1,748,449 | * | 2/1930 | Hughett | 43/131 |
| 1,815,595 | * | 7/1931 | Simpson | 43/131 |
| 1,964,611 | * | 6/1934 | Watson | 43/131 |
| 2,239,937 | * | 4/1941 | Smith | 43/131 |
| 2,837,861 | * | 6/1958 | Graham, Sr. | 43/131 |
| 3,303,600 | * | 2/1967 | Freeman | 43/131 |
| 3,978,607 | * | 9/1976 | Piere | 43/131 |
| 4,208,829 | * | 6/1980 | Manning | 43/131 |
| 4,214,400 | * | 7/1980 | Patmore et al. | 43/121 |
| 4,364,194 | * | 12/1982 | Clark | 43/121 |
| 5,184,417 | * | 2/1993 | Weldon | 43/122 |
| 5,379,545 | * | 1/1995 | Gall et al. | 43/131 |

* cited by examiner

Primary Examiner—Kurt Rowan
(74) Attorney, Agent, or Firm—Cesari & McKenna

(57) ABSTRACT

A pest control device is provided for deterring or attracting creatures which feed on vegetables, fruits and flowers grown by farmers and gardeners. The device includes a base portion within which an odorous substance is disposed. The odorous substance is selected to either deter or attract pests and insects. A cap portion is removably securable to the base portion and covers the base portion to prevent the gravitational accumulation of rainwater therein. An unsealed region between the base portion and the cap portion allows odors from the odorous substance within the base portion to flow into the ambient environment.

12 Claims, 6 Drawing Sheets

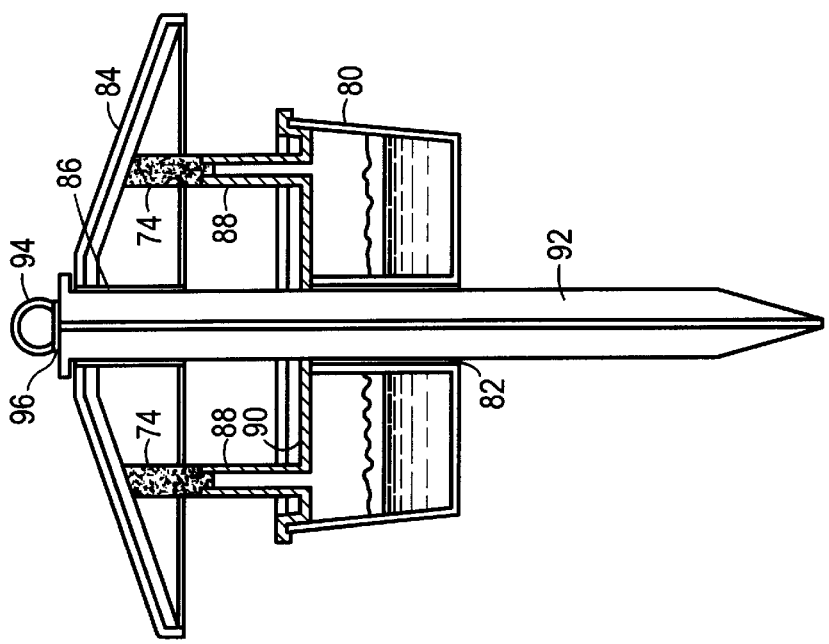
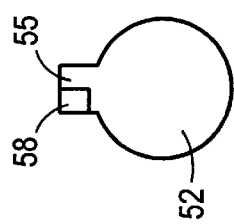
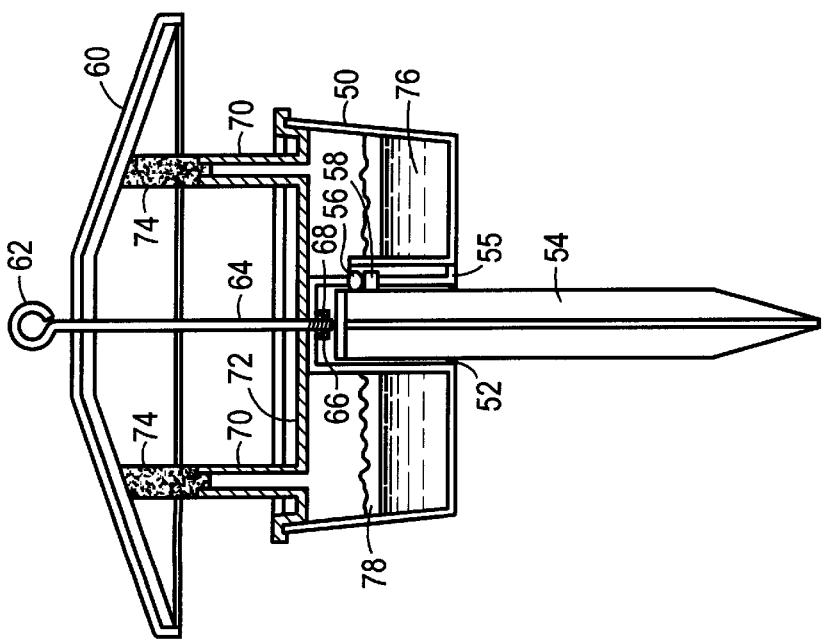

GARDEN PEST CONTROL DEVICE

This application is a continuation of Ser. No. 08/399,570 filed Mar. 7, 1995, abn.

BACKGROUND OF THE INVENTION

1. Field of the Invention

This invention relates to the field of gardening, and more particularly to a pest control device capable of repelling or attracting animals and insects to a garden.

2. Description of the Related Art

Traditionally, animals such as rabbits, woodchucks, birds and insects and the like have been a nuisance to both gardeners and farmers, because they feed on cultivated vegetables, flowers and fruits. Consequently, many different methods have been attempted to dissuade these creatures from pillaging gardens and crops. However, most of these methods have proven, at best, to be only partially effective and some of the methods degrade the environment by threatening the quality of ground water or by eliminating helpful creatures.

Fencing around the garden has proven inadequate for the simple reason that many of these creatures burrow underneath a fence, not to mention the ability of birds to simply fly over it or slip through it. Visual devices such as scarecrows are also limited in their ability to drive away garden pests. Even sonic transmitters have been attempted as a way to drive off burrowing creatures, but have met with limited success. There are sprays for bushes and fruit trees used to discourage deer and other animals, but these sprays often have to be reapplied after each rain.

Pesticides have been sprayed on plants and poison placed in baited traps to kill unwanted pests. However, many farmers, and most gardeners, are uncomfortable with the use of such chemicals because of their potential toxicity to humans and overall damaging impact on the environment.

Hence, there is a need in the field of garden pest control for a device which is inexpensive and environmentally friendly.

SUMMARY OF THE INVENTION

An object of the present invention is to provide an environmentally friendly garden pest control device.

Another object of the present invention is to provide a non-lethal pest control device which repels pests such as a animals and insects.

Another object of the present invention is to provide a device which attracts animals and insects.

According to the present invention, a pest control device includes a partially open container in which an odorous substance is stored. The odorous substance can be chosen to provide either an odor which repels animals and insects, or an odor which attracts certain animals and insects. The container is open at the top to allow odors to escape while preventing leakage of the odorous substance. The container includes a cap which shelters the open top, while allowing odors from the odorous substance to permeate into the surrounding ambient atmosphere. The cap prevents rain, dust and the like from falling into the container and potentially overflowing it, or diluting the odorous contents.

The cap has a shape which allows moisture to drain away from the container, such as a dome, or perhaps, an inverted cone or the like. In addition, the cap may be removably attachable to the container to prevent inadvertent dislodging of the cap.

The base is substantially cylindrical and is rigidly connected to an inner, concentric cylindrical element which resides within the container. The odorous substance is disposed in the container formed by the toroidal space between the two concentric cylinders. The inner cylinder may have threads which engage threads located on the cap to hold the base and cap together. Any space within the inner cylinder may also be used to store ballast such as dirt or sand to stabilize the container where wind may be strong enough to tip the container, especially when it is suspended.

The pest control device may also include a stake guideway disposed within the container, to provide a hollow pathway from the top of the base through the bottom of the base. An outer surface of the guideway is sealed to the base and, therefore, no leakage of odorous substance occurs. The stake guideway provides a direct passage from above the top surface of the odorous substance through to a surface below the base. A stake may be located within the stake guideway and driven into the surface below the container, typically the earth, to secure the device.

The pest control device may also include a suspension mechanism, such as a hook or an eyelet affixed to the cap which allows the container to be suspended. The cap may include a threaded hole (as opposed to a fixed eyelet or hook) into which a threaded eyelet or a hook can be inserted. As such, the hook or eyelet can be added by the user if it becomes desirable to suspend the device.

To replenish the pest control device with the odorous substance, the cap may include a movable segment such as a slidable door which, when opened, exposes the container region of the base. When closed, the door places the device in its normal functioning condition.

The pest control device may also include an electric fan on the underside of the cap to distribute the odor of the odorous substance more effectively. The fan may be battery powered, or preferably powered by a solar cell or panel located on the top of the cap. Thus, sunlight reaching the cell is converted to electrical current which drives the fan.

In another embodiment to the invention, the base is an oblong trough within which the odorous substance is disposed. The open top of the trough would be covered by a roof-like cap, which is preferably "A" shaped. The trough-like containers may be made to any desired length, and allow a user the option of one long odorous substance barrier. As such, multiple troughs may be used to surround virtually any size parcel of cultivated land which a user desires to protect.

A feature of the pest control device of the present invention is that it can be configured to either attract or repel pests, such as animals and insects to and from a garden, or any certain geographic location. As a repellent, the present invention is an environmentally friendly mechanism which releases an odor repugnant to pests. To attract desirable creatures, the device releases a captivating odor to draw the creatures to the garden.

These and other objects, features and advantages of the present invention will become more apparent in light of the following detailed description of several exemplary embodiments thereof as illustrated in the accompanying drawings.

BRIEF DESCRIPTION OF THE DRAWINGS

FIG. 3 is a cross-sectional side view of another pest control device embodiment capable of being either suspended, or mounted securely to the ground;

FIG. 3A is an illustration of a cross-sectional top view of a stake guideway;

FIG. 5 is a cross-sectional side view of an embodiment of the invention in which a stake holds a cap portion of the device to a base portion as well as securing the device to the earth;

DESCRIPTION OF A PREFERRED EMBODIMENT

Figures 1, 2:
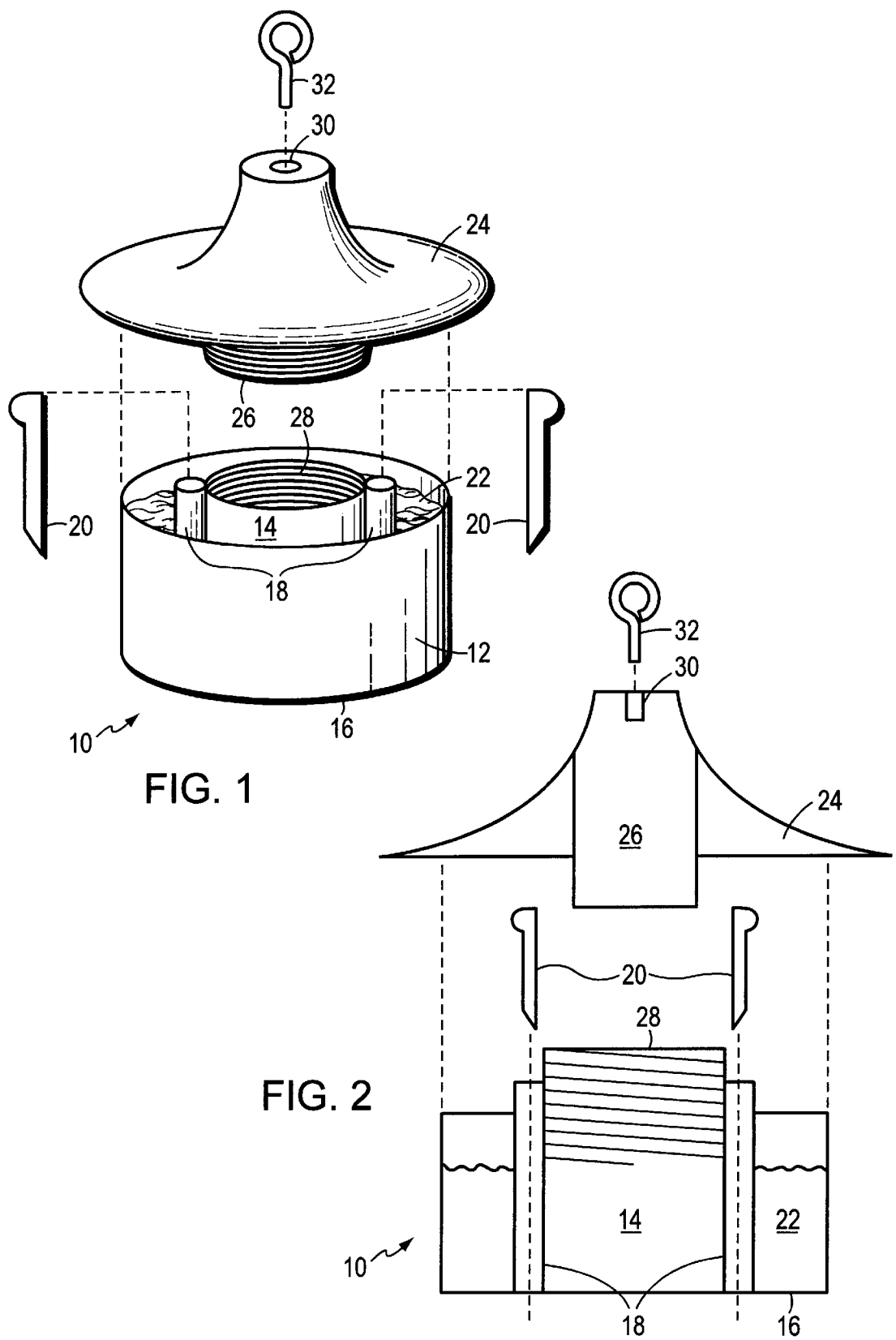
FIG. 1 is an isometric exploded view of a garden pest control device according to the present invention.
FIG. 2 is an exploded, cross-sectional view of the garden pest control device shown in FIG. 1.

FIG. 1 illustrates a garden pest control device 10 having a cylindrically-shaped base 12 and an inner cylinder 14 disposed concentrically therein. The inner cylinder 14 is rigidly affixed to a bottom portion 16 of the base 12. The inner cylinder is open at the top and may be filled with a ballast material such as dirt or sand, to help keep the device in place.

Also rigidly affixed to the base 12, and adjacent to the inner cylinder 14, are stake guideways 18. The stake guideways 18 are cylindrically-shaped, and provide a conduit through the bottom portion 16 of the base 12, thus resulting in holes in the otherwise circular bottom portion 16. These guideways 18 are sized to receive stakes 20 which can be driven into a surface below, such as the earth. Thus, in practice, the base 12 is placed on the ground in the vicinity of plants to be protected. The stakes 20 are then placed in the stake guideway and driven into the ground, thereby firmly holding the base 12 in place.

Despite the passages in the bottom portion 16 required for the stakes 20, the stake guideways 18 are tightly sealed to the bottom portion 16, as is inner cylinder 14. The base 12 thereby forms a leakproof container having a substantially toroidal containing region. Located within the containing region of the base 12 is an odorous substance 22 which, in a preferred embodiment, may be a liquid or solid. The odorous substance 22 is preferably a material having either a pungent odor known to repel unwanted animals, or a captivating odor to attract desirable creatures. Ammonia has been found to be a particularly effective deterrent material, but moth balls, pepper, soap, dried blood, human and dog hair, and tobacco may also be used, as well as other known deterrents such as commercially available products sold under the trademarks THIRAM™ and HINDER™, and products having similar characteristics. Effective attractants may include sweet smelling substances such as honey and essence of citrus. In general, the type of odorous substance selected will depend upon the requirements of each user application.

In order to prevent the gravitational accumulation of rainwater or other material in the base 12, the pest control device 10 includes a cap 24 which covers the open top of the base 12. The cap 24 is shaped to match the shape of the base 12, but is preferably wider in diameter to provide an overhang which extends beyond the upwardly projecting sidewalls of the base 12. Thus, moisture runs off the edge of cap 24 and drips to the ground below rather than finding its way into the container formed in the base 12. As shown in FIGS. 1 and 2, the top surface of the cap 24 is preferably elevated in the middle to promote the gravitational runoff of moisture due to the pitch of the cap 24. The cap 24 shown in FIG. 1 is shaped somewhat like an inverted cone, but other shapes, such as a dome or a pyramid, provide a similar effect.

To prevent the cap 24 from becoming dislodged from the base 12, a removable connection is provided to hold the base and cap together. A threaded center portion 26 is sized to mesh with threads 28 located on the inner cylinder 14. In the embodiment shown, the threads on the inner portion 26 are on an outside surface, while the threads on the inner cylinder 14 are on an inner surface, although the reverse could just as easily be true. In operation, after filling the container with the desired odorous material 22, the cap 24 is screwed into the base by meshing the threads 26 and 28 and rotating the cap accordingly.

In a preferred embodiment, the threads on both the inner portion 26 and the inner cylinder 14 are sufficiently long to allow the cap to be screwed down to the base 12 to the point where a flat surface on the underside of the cap 24 contacts an upper rim of the base 12. When screwed all the way down in this manner, the odorous substance 22 is sealed within the pest controller 10, and the device is effectively disabled. This feature may be particularly desirable to a user who is working in the vicinity of the device (as when working in the garden), and who does not wish to be exposed to offensive odors which the pest control device 10 may otherwise produce. In addition, varying the distance between the rim of the base 12 and the sealing surface of the cap 24 allows a user to control the potency of the pest control device 10 by changing the size of the opening through which the odor permeates.

The pest control device may also include a threaded mounting hole 30 which is located in the cap 24. The mounting hole 30 is cut to a standard size, and allows the insertion of a suspension mechanism such as a hook or, in this case, an eyelet 32. The eyelet 32 may also be made integral with the cap 24, if so desired. With the cap 24 attached to the base 12, the pest control device 10 may be suspended by the eyelet 32. This allows the pest control device 10 to be suspended in a tree or other area where it is desirable to deter birds or climbing animals.

FIG. 3 illustrates another pest control device embodiment having a base 50 which forms a substantially toroidal containing region. The toroidal shape of the containing region surrounds a substantially cylindrical stake guideway 52 in the center of the base, and into which a stake 54 may be removably inserted to secure the base to the ground.

To allow the stake 54 to be interchangeably added and removed, a tab channel 55 is provided within which a tab 56 of the stake 54 may be inserted as the stake 54 is inserted into the stake guideway 52. As the stake 54 is inserted into stake guideway 52, the tab 56 is inserted past a tab lock 58, which projects across only part of the tab channel 55. This partial coverage is demonstrated by the isolated, cross-sectional top view of FIG. 3A. Once the tab 56 is past the tab lock 58, the stake 54 is rotated within the stake guideway 52, such that, the tab 56 is positioned above the tab lock 58. In this position, movement of the stake 54 away from the base 50 is prevented until the stake is subsequently rotated in an opposite direction to free the tab 56 from the obstruction of the tab lock 58.

The removable stake 54 of FIG. 3 is advantageous for allowing the simple hand-held attachment and removal of the stake to the base 50, as well as providing ease of manufacture for the base 50 and the stake 54. For example, both the base 50 and the stake 54 can be injection molded at a low cost. An additional feature of this embodiment is a suspension mechanism (e.g., an eyelet 62) which is integral with the device which secures the cap and base together. In this case, the eyelet 62 is integral with a securing rod 64 which passes through the cap down to the upper surface of the stake guideway 52. A lower end of the rod 64 has screw threads 66 which mate with corresponding threads 68 formed in the top surface of stake guideway 52.

The separation between the cap 60 and the base 50 is maintained by cap supports 70 and cap posts 74. The cap supports 70 are both rigidly connected to a support bracket 72. In practice, the cap 60 is located such that the cap posts 74 contact the top of the cap supports 70. Rod 64 is then inserted through the top of the cap 60, and the threads 66 of rod 64 mesh with the threads 68 by hand tightening the eyelet 62 to secure the cap to the base. Once the cap 60 is securely connected to the base 50, the pest control device may be suspended by the eyelet 62, or the stake 54 can be inserted into the stake guideway 52 to secure the device to the earth. If the pest control device is placed on a hard planar surface, the stake 54 may be omitted, and the base unit 50 simply laid on the desired surface.

Another feature shown in the embodiment of FIG. 3 is the use of an absorbent material 76 in the containing region of the base 50. A sponge-like material may be used, although alternative absorbing materials may be equally effective. The absorbent material 76 provides a porous framework within which an odorous fluid substance may reside. This framework helps to prevent spillage of the odorous substance 78 and helps to slow evaporation.

Figure 4:
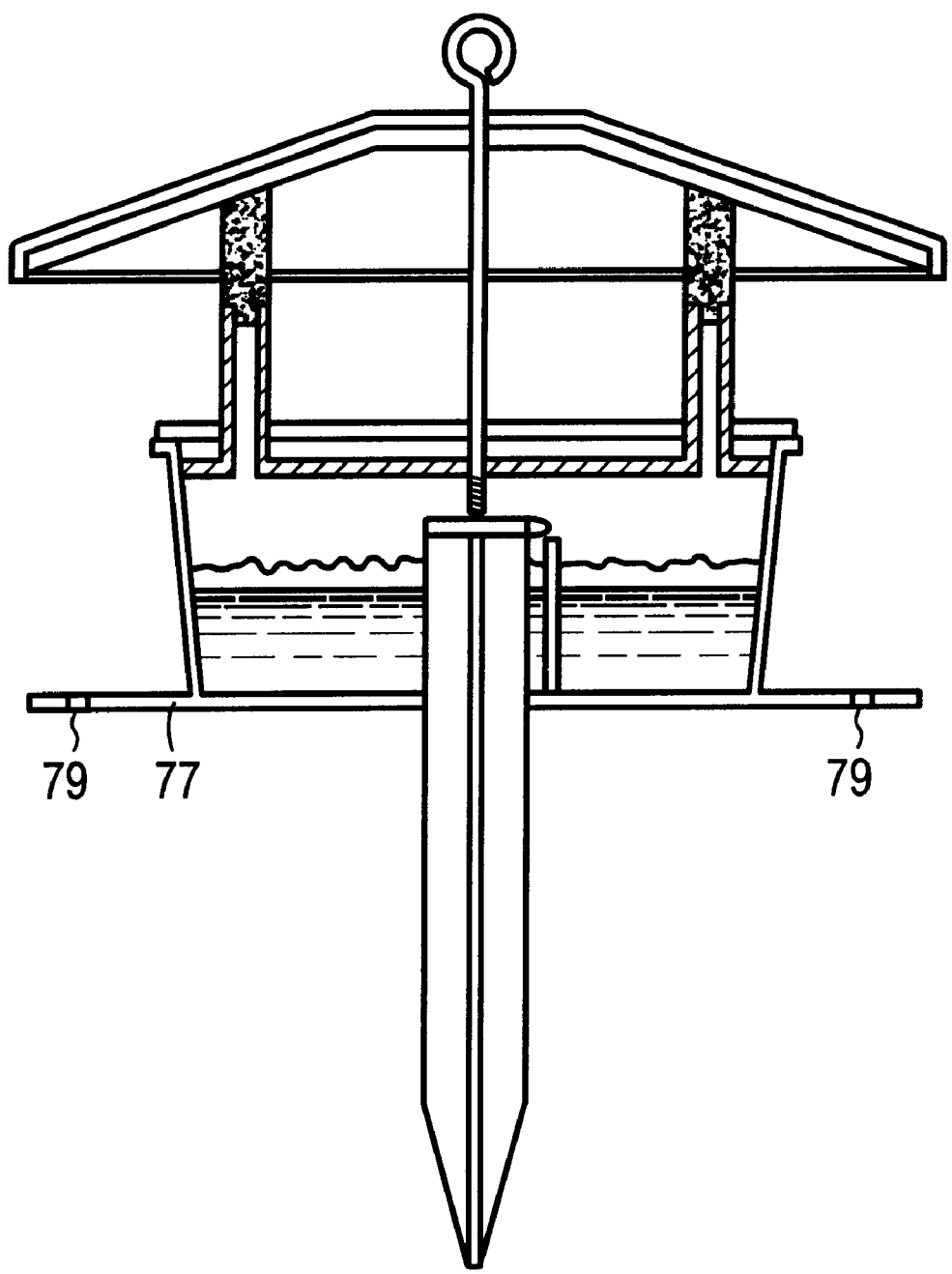
FIG. 4 is a cross-sectional side view of yet another pest control device embodiment capable of being mounted to virtually any surface.

FIG. 4 illustrates an embodiment of the pest controller suitable to mounting to virtually any surface. The embodiment in FIG. 4 is substantially the same as the embodiment in FIG. 3 with the exception that the embodiment in FIG. 4 includes a plate 77 which extends from the lower surface of the base. The plate 77 includes a plurality of holes 79 which allows the device to be securely mounted to a windowsill (e.g., to deter nesting birds) using nails, or to virtually any other surface including the ground. The underside to the plate 77 may also be compatible with various adhesives to allow the device to be mounted using an adhesive, rather than a fastener.

FIG. 5 illustrates yet another embodiment of the present invention in which the stake guideway consists of a channel 82 running through a base 80, as well as a coaxial channel 86 through a cap 84. The two channels 82, 86 are aligned with each other when the cap posts 74 are positioned atop the cap supports 88 of mounting bracket 90. A full length stake 92 may then be passed through both the cap 84 and the base 80 and pressed into a surface below the base 80, such as the earth. An advantage of this embodiment is that the full length stake 92 secures the cap 84 to the base 80, and secures the entire device to the earth below. A stake removal ring 94 is attached to the top of the full length stake 92 to allow user to easily withdraw the stake 92 from the earth. The stake removal ring 94 is preferably attached to the top of the full length stake 92 by a lateral hinge 96 which allows the ring 94 to be folded down against the top of the stake 92, thus reducing the height of the pest control device and improving its aesthetic appearance.

Figure 6:
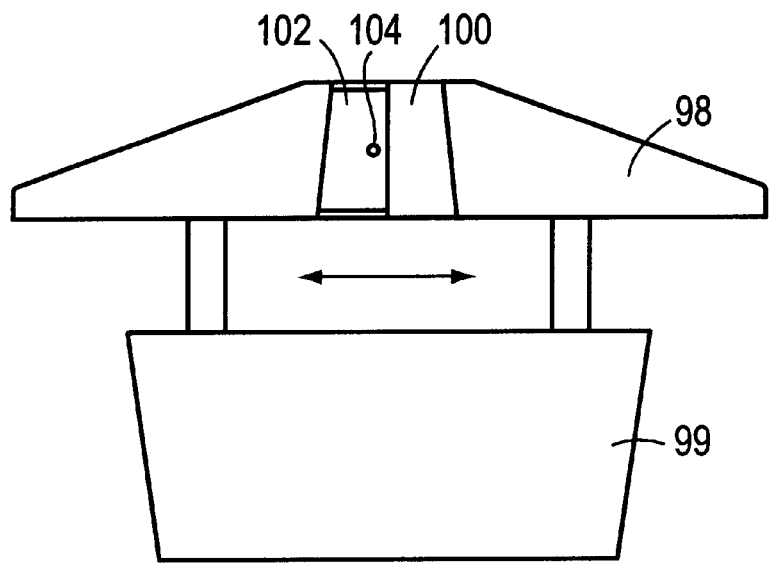
FIG. 6 is a cross-sectional side view of an embodiment having a slideable door located in a cap portion of the device.

The embodiment shown in FIG. 6 illustrates a feature that can be combined with each of the other embodiments described herein. Shown in FIG. 6 is a pest control device having a cap 98 with a sliding door 102 which is attached to the cap 98 in a manner conventional in the art of sliding doors. A projecting knob 104 on the door 102 provides a handle by which a user may slide the door 102 open or closed. When the door 102 is open, the odorous substance can be easily added to the container formed in the base, without having to remove the cover. When closed, the door completes the surface of the cap 98 to protect the odorous substance in the container from rainwater or other settling material. It is contemplated that various other embodiments may be used including a hinged door or a removable door, or any other protective barrier which allows easy access to the container.

Figure 7:
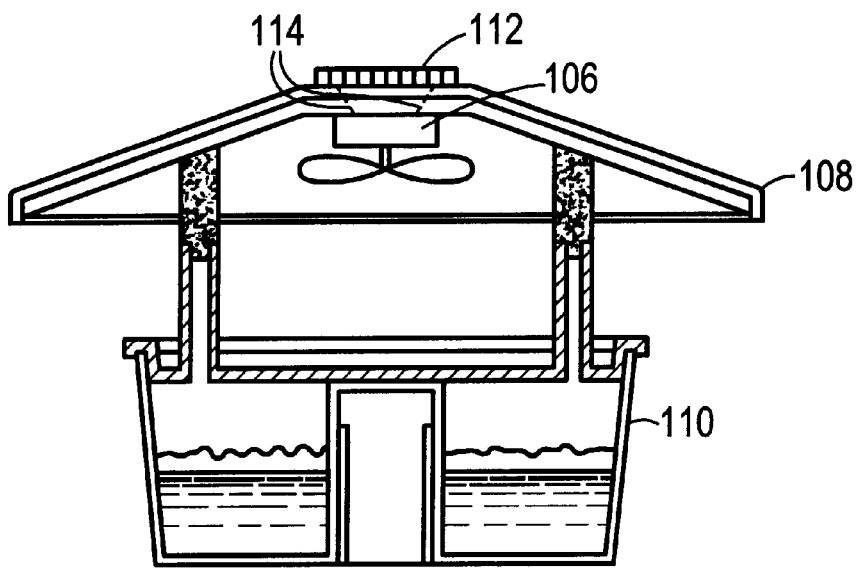
FIG. 7 is a cross-sectional side view of an embodiment of the invention in which a fan is located on the underside of a cap portion of the device.

FIG. 7 is a cross-section illustration of still another embodiment of the invention. A fan 106 is mounted in a cap 108 of the pest control device. The fan 106 is electrically powered and enhances the circulation of odor to the external ambient environment, thereby increasing the coverage area and the effectiveness of the device.

Preferably, the electrical power to drive the fan 106 is provided by a solar panel 112 and the fan 106 is electrically connected to the solar panel 112 by wires 114. A battery (not shown) may also be used, alone, or in conjunction with the solar array 112, to store electrical power to drive the fan 106.

Figure 8:
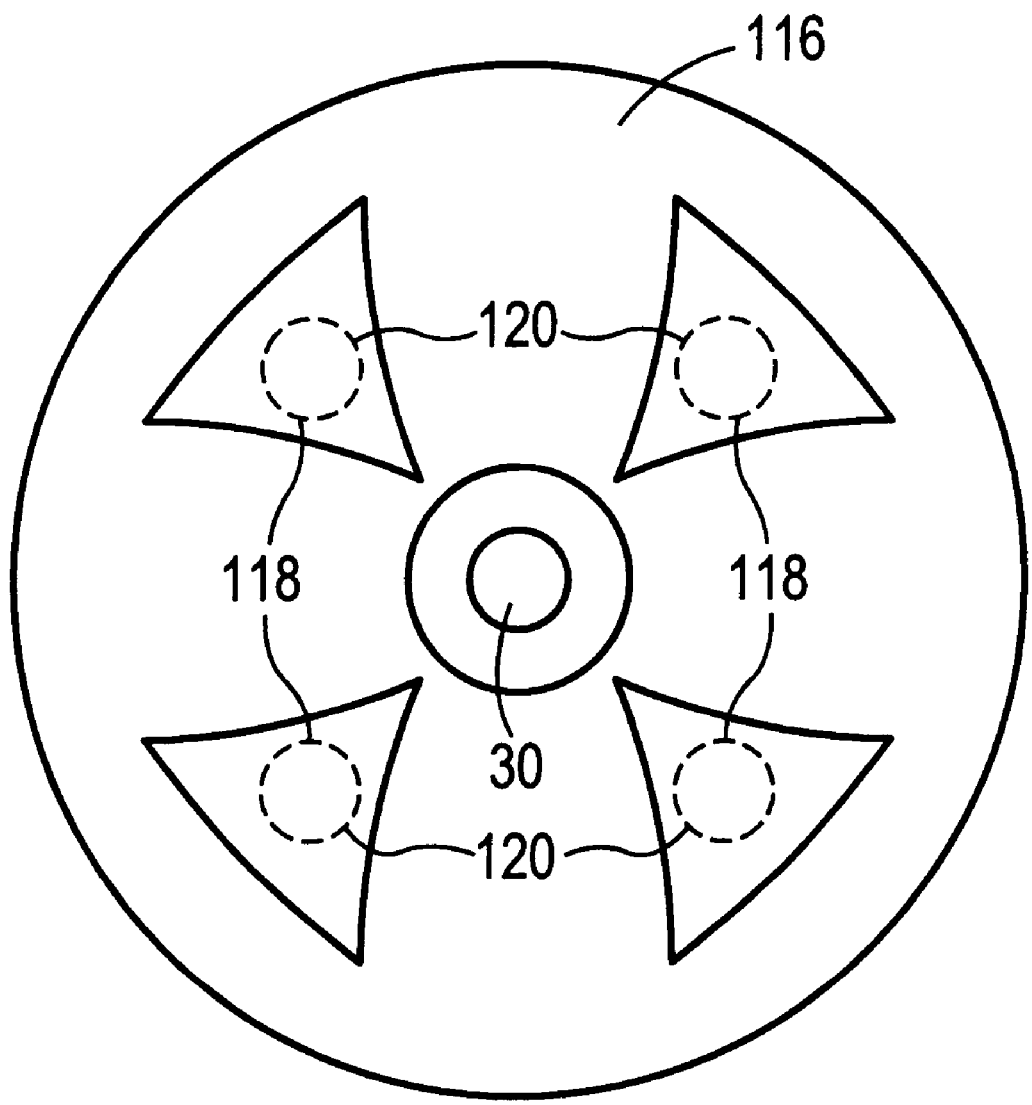
FIG. 8 is a top view of a pest control device cover having a plurality of sheltered openings formed therein to increase the outward vapor flow of the odorous material.

To further facilitate the permeation of odors from the device, FIG. 8 illustrates a top view of a pest control device 116 cover having a plurality of sheltered openings 118 formed therein. Each opening includes an overhang 120 which prevents rain water and the like from flowing in through the openings, while allowing odorous vapors which may accumulate along the inside of the cover to easily exit the device.

Figure 9:
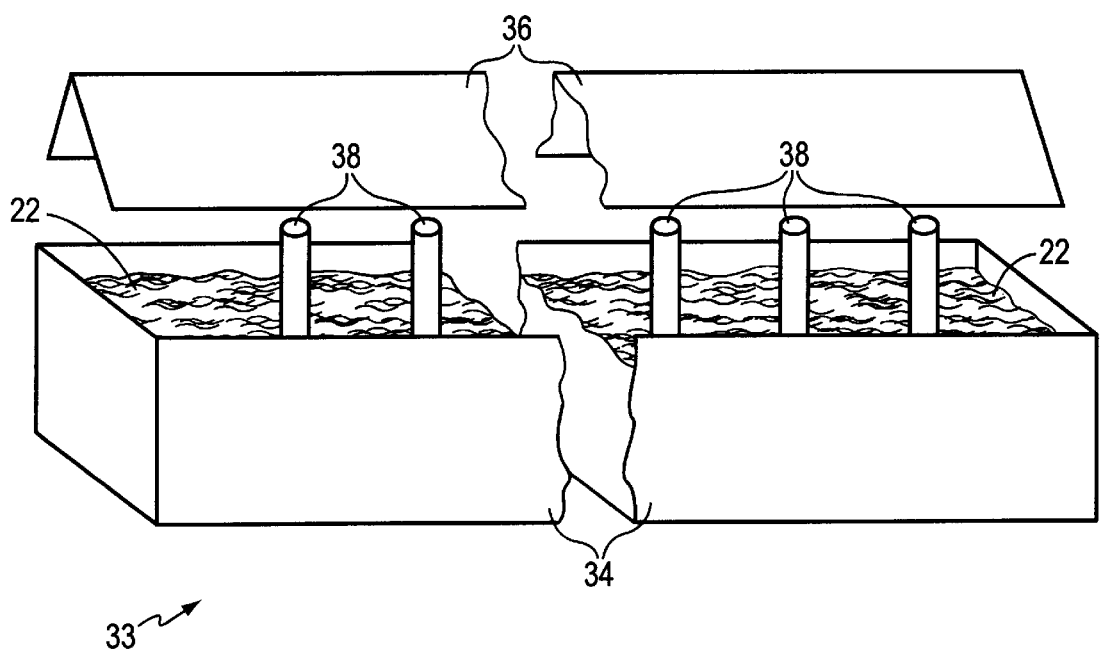
FIG. 9 is an isometric view of an alternative embodiment of the invention, as used to surround and protect a particular plot of land.

The pest control device of the present invention can also be used in large industrial applications. FIG. 9 is an illustration of such an embodiment 33 in which the base unit 34 is an oblong trough. Because the trough 34 is typically much longer than it is wide or high, the center portion of the device is cut away in the figure to allow it to be shown at a larger scale. It will be understood that the center portion which is cut away is simply a continuation of the shape and composition of the portions of the base unit 34 which are shown.

The base unit 34 is filled with the odorous substance 22 which extends all the way along the length of the trough 34. The odorous substance 22 is the same as that of the previous embodiments, and the same variety of odorous substance choices are therefore available. Mounted above the trough 34 is a roof 36 which covers the trough 34 and prevents the gravitational accumulation of rainwater and/or other material. The roof 36 is supported by a plurality of supports 38, which will vary in number depending on the length of the trough 34. An underside of the roof 36 rests on supports 38, or is permanently affixed thereto.

Figure 10:
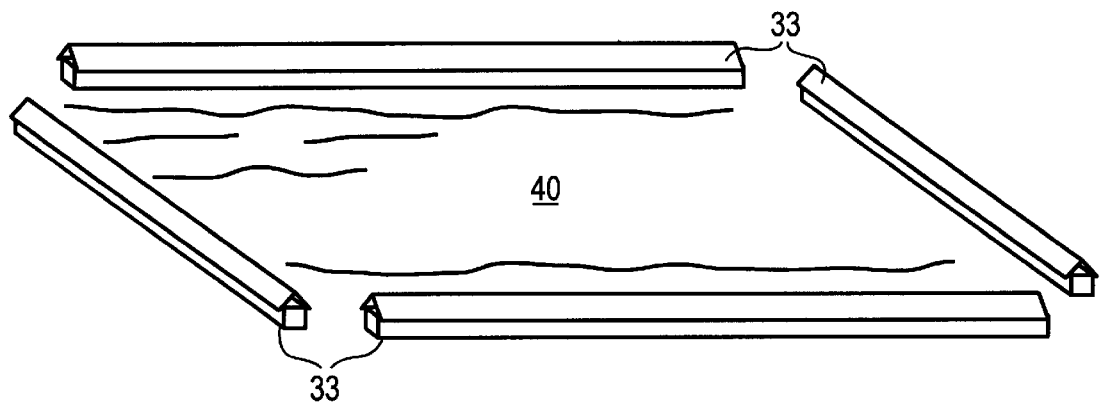
FIG. 10 is an isometric, segmented view of an alternative embodiment of the garden pest control device of the present invention.

A preferred use for the trough embodiment of FIG. 9 is shown in the isometric view of FIG. 10. As shown, a field of crops 40 is surrounded on four sides by a plurality of pest control devices 33. Arrangement of the devices 33 in this manner provides a pest control barrier about the entire perimeter of the growing area of the field 40. It will be quickly recognized by those skilled in the art that the formation of such a perimeter barrier may be made with other shapes and configurations of the present invention. For example, the devices 33 might be circular in shape surrounding a circular parcel of land, or the trough portions 34 might be linked together in a square or rectangular shape to provide a continuous enclosure surrounding the growing field 40. Any of these variations is within the scope of the present invention. In addition, the system may include pumping stations, reservoirs, and other components necessary for large applications.

Although the present invention has been shown in a number of embodiment herein, there are many other modifications and embodiment which are within the scope of the present invention. As an example, the pest control device is not limited to operating as either a repellent or an attractant. The pest control device may include both a repugnant substance to repel certain creatures, and a captivating substance to attract other types of creatures. The pest control device is also not limited to being suspended from its cover; the device may be suspended from supports in the base or the upwardly facing sidewalls. The pest control device may also be incorporated into an ornamental lawn figure, and may include a marker to facilitate quickly locating the device in a garden.

In addition, while the invention has been particularly shown and described with references to the preferred embodiments herein, it will be understood by those skilled in the art that various changes in form and detail may be made without departing from the spirit and scope of the invention as defined by the appended claims. For example, mixing and matching of the foregoing embodiments provides devices having a desired combination of features. Therefore, any such combination is likewise considered to be within the scope of the present invention.

What is claimed is:

1. An animal control device comprising:
   a base portion having a plurality of containing regions;
   a cap portion which covers said containing regions to prevent the gravitational accumulation of material in said containing regions;
   at least two odor-producing odorous substances located within said containing regions of said base portion and exposed to an ambient environment surrounding the device; and
   a stake which passes through said base portion and said cap portion to removably secure said cap portion in position over said base portion, and to secure said base portion to the ground;
   wherein one of said substances produces respective odors which repel certain creatures and another of said substances produces other respective odors which attract desirable creatures, said odors from said substances being released to the ambient environment.

2. An animal control device according to claim 1 wherein said base portion comprises a stake guideway within which said stake passes to secure said base portion to the ground.

3. An animal control device according to claim 2 wherein said stake guideway is disposed within an outer perimeter of said base portion and provides a vertical conduit through said base portion.

4. An animal control device according to claim 1 wherein said base portion comprises an oblong trough.

5. An animal control device according to claim 1 wherein an outer region of said cap portion overhangs an outer perimeter of said base portion and has an upper surface which is sloped to promote drainage of moisture from said cap portion.

6. An animal control device according to claim 1 wherein said stake comprises a lip which is wider than a shaft portion of the stake, wherein the lip is too wide to pass through a channel of the cap portion through which the stake shaft passes.

7. An animal control device according to claim 1 wherein said cap portion comprises a sliding door which allows said odorous substances to be placed in said regions while said cap portion remains securably attached to said base portion.

8. An animal control device according to claim 1 further comprising a fan located between the cap portion and the base portion.

9. A pest control system, comprising:
   a plurality of pest control devices interconnected together to form a pest control barrier surrounding a certain geographic area, wherein each of said pest control devices includes
   A. a base portion having a containing region;
   B. a cap portion which covers said containing region to prevent the gravitational accumulation of material in said containing region; and
   C. at least one odor-producing odorous substance located within said containing region of said base portion and exposed to an ambient environment surrounding the device to allow odors from said odorous substance to be released to the surrounding ambient environment.

10. A pest control system according to claim 9, wherein each respective containing region of said pest control devices contains at least one of a first odorous substance which repels certain creatures and a second odorous substance which attracts desirable creatures, said system containing both said first and second substances so as to repel said certain creatures from the geographic area surrounded by said barrier and to attract said desirable creatures to said geographic area.

11. A pest control system according to claim 10, wherein each said respective containing region contains both said first and second substances.

12. A pest control system according to claim 11, wherein each of said pest control devices includes a respective solar cell for converting light into electricity for powering a respective fan for distributing odors produced by said first and second substances.

* * * * *